United States Patent Office 3,609,994
Patented Oct. 5, 1971

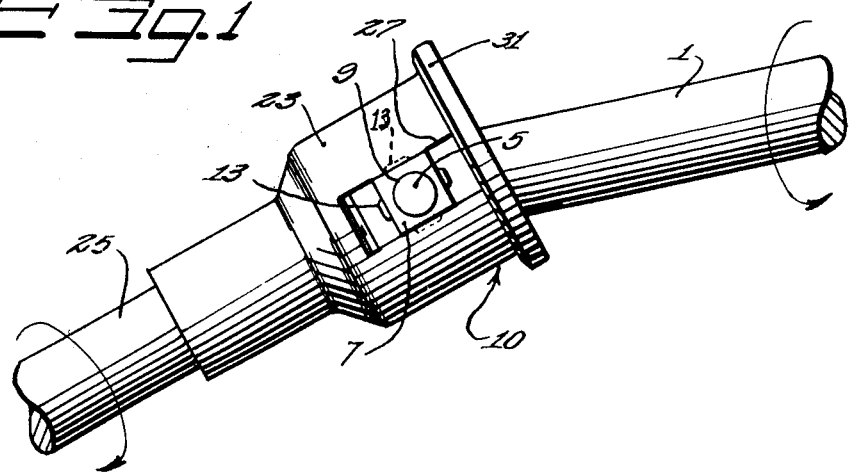
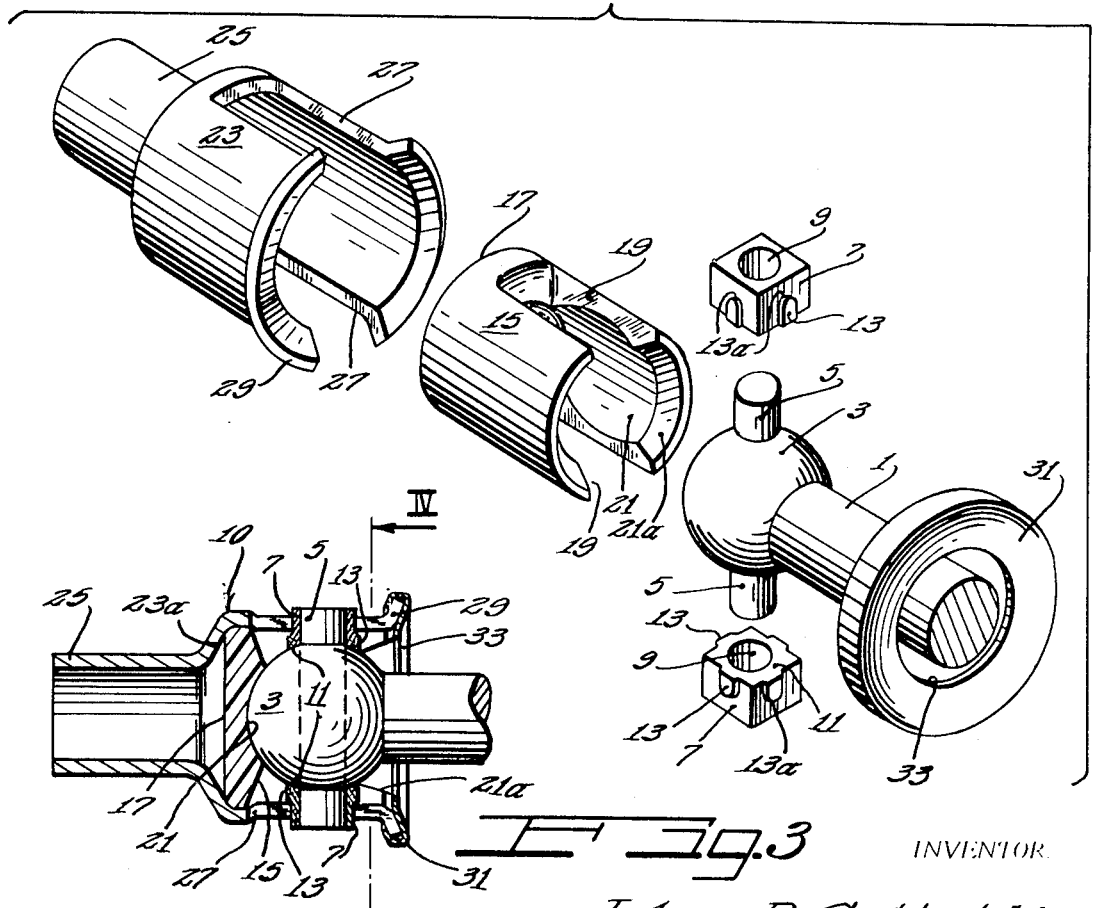

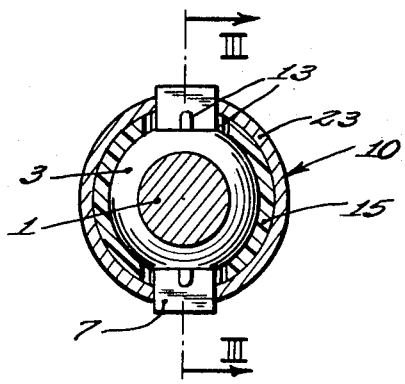
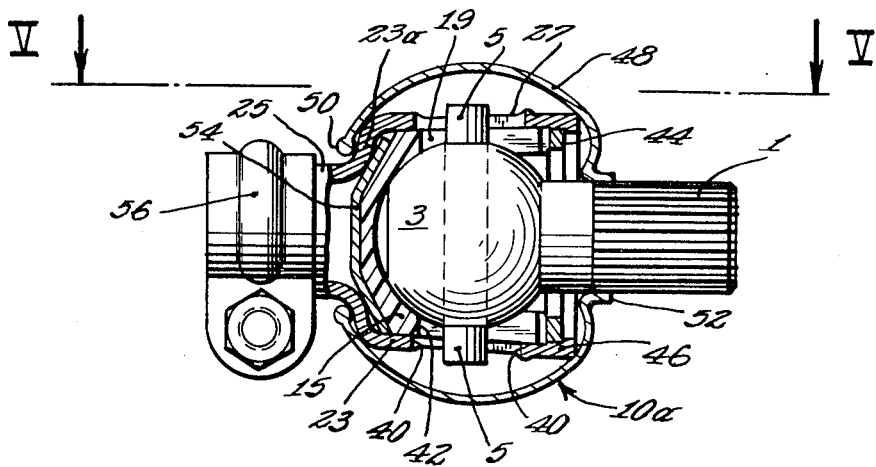
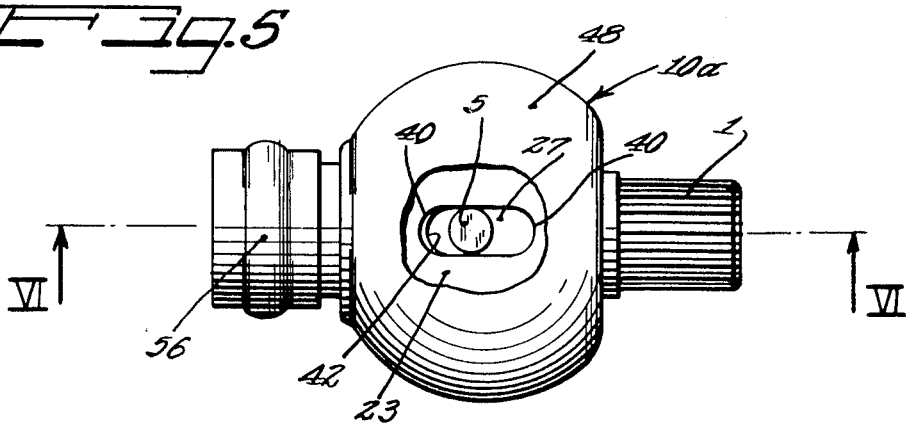

3,609,994
UNIVERSAL JOINT
John B. Colletti, Grosse Pointe Park, and Leonard J. Zukowski, Detroit, Mich., assignors to TRW, Inc., Warren, Mich.
Filed Oct. 1, 1969, Ser. No. 862,756
Int. Cl. F16d *3/16*
U.S. Cl. 64—8                                                10 Claims

ABSTRACT OF THE DISCLOSURE

A universal joint coupling accommodating transmission of rotating forces through shafts in angular relation to each other, and especially useful in steering columns of vehicles, including vehicles equipped with tiltable or swingable steering wheels. The joint coupling has a plastic bearing mounted in a housing at the end of one shaft which forms the bearing surface for a ball mounted at the end of a second shaft. The ball has oppositely-extending projections rotatable and slidable in opposite slots in the housing. The structure not only transmits rotation of the shafts, but accommodates axial displacement of the shafts through sliding movement of the projections in the slots of the housing.

FIELD OF THE INVENTION

This invention relates to universal joint couplings capable of transmitting rotation through shafts in angular relation to each other and also accommodating axial displacement of the shafts. The couplings of this invention are especially useful in steering column linkages for vehicles where rotation of the steering wheel must be transmitted along angled paths due to body and engine design and where tiltable or shiftable steering wheels are provided.

BRIEF DESCRIPTION OF THE INVENTION

The universal joint couplings of this invention include a housing mountable at the end of a first shaft. A plastic bearing is fitted in this housing and provides a bearing surface for a ball member which is mounted on the end of a second shaft. The housing is longitudinally slotted, and the ball has projections riding in the slots of the housing. The second shaft can tilt freely about the axis of the projections on the ball, and the slots in the housing will accommodate some axial displacement of the shafts. The axial displacement feature is very useful in applications where deflection of anchor points for the shafts will cause a change in the effective length thereof.

It is then an object of this invention to provide a universal joint coupling especially useful in steering columns of automotive vehicles for rotatively connecting a pair of steering shafts to transmit torsion therebetween throughout a wide angular range, while at the same time accommodating axial shifting of the shafts through a limited range.

Another object of this invention is to provide an inexpensive universal joint coupling including a ball member on the end of a first shaft having diametrically opposed projections and a ball housing on the end of a second shaft receiving the ball and provided with slots receiving the projections.

A still further object of this invention is to provide an easily assembled, inexpensive universal joint coupling for automotive steering columns.

Another object of the invention is to provide a ball and socket type universal joint coupling with slot and pin connections accommodating axial displacement without loss of rotation.

Other objects, features and advantages of the invention will be readily apparent from the following description of certain preferred embodiments of the invention, taken in conjunction with the accompanying drawings, although variations and modifications may be effected without departing from the spirit and scope of the novel concepts of the disclosure.

BRIEF DESCRIPTION OF THE DRAWINGS

FIG. 1 is a side elevational view of the universal joint;
FIG. 2 is an exploded view in perspective of the universal joint shown in FIG. 1;
FIG. 3 is a vertical cross sectional view of the joint taken on line III—III of FIG. 4;
FIG. 4 is a vertical cross sectional view of the joint taken on the line IV—IV of FIG. 3;
FIG. 5 is a side elevational view of another modification of the joint; and
FIG. 6 is a horizontal cross section of the joint shown in FIG. 5, taken along the line VI—VI.

DESCRIPTION OF THE PREFERRED EMBODIMENTS

In the embodiment of FIGS. 1–4 the universal joint coupling 10 is illustrated as including a first shaft 1, on the end of which is mounted a ball 3 which may be an integral head on the shaft or separately united to the shaft. Dowel pins 5 extend from diametrically opposite sides of the ball 3 normal to the shaft, and may be formed integrally with the ball or formed as a separate pin press-fitted in a bore through the ball. Rectangular (preferably square) shaped bushing 7 with bores 9 therethrough fit on the dowel pins 5 in snug but rotatable relation. As shown in FIG. 3, the inner ends 11 of the bushings 7 are concave to conform with the surface of the ball 3. A lug-like projection 13 is provided on each side wall of the bushing 7 and extends from the concave end face 11 only about halfway along the height of the side wall, where it terminates in a rounded end 13a.

A cup-shaped plastic bearing 15, preferably composed of nylon, Teflon (polytetrafluoroethylene) or the like self-lubricating, wear-resisting plastic receives the ball 3 with its dowel pins 5. This bearing 15, as illustrated, has a cylindrical outer periphery and is closed at one end 17 and open at the other end. Diametrically opposed longitudinal slots 19 extend inwardly from the open end into spaced relation from the closed end 17. The inner face of the closed end 17 has a concave recess 21 in its central portion contoured to snugly receive and seat the free end of the ball 3, as shown in FIG. 3. The ball socket seat ensures centering of the ball and keeps the shafts in alignment.

The bushings 7 are preferably made of sintered iron to resist the thrust loads placed on the coupling in heavy usage. For light duty application, the bushings can be made of the same plastic material as the bearing 15. The bushings slidably fit in the slots 19, with the projections 13 disposed inside of the side wall of the bearing 15 and effective to ride on the inner surface of the bearing to not only hold the bushing in the slots, but to also center the ball 3 in alignment with the seat 21.

As shown in FIG. 3, the dowel pins 5 and the bushings 7 project beyond the periphery of the cylindrical bearing 15.

A cup-like housing 23 is integrally formed or mounted on the end of a second shaft 25, and this housing has longitudinal slots 27 matching the slots 19 of the bearing 15, but somewhat narrower than the slots 19, so that the ends 13a of the projections 13 on the bushings 7 can slide in the housing and retain the bushings on the pins 5. The interior of the housing 23 is cylindrical, and its open end is provided with a flared mouth 29 over which an annular cap 31 is crimped, as shown in FIGS. 1 and 3. The cap 31 has a circular opening 33 therethrough sufficiently larger than the shaft 1 to enable the shaft to tilt freely through a considerable angle in the mouth of the bearing 15 and housing 23.

It will be apparent from FIGS. 2 and 3 that the ball seat 21 provided in the cylindrical bearing 15 not only receives the free end portion of the ball 3, but also surrounds a considerable portion of the periphery of the ball. The ball socket 21 thus provided, however, does not interfere with tilting the ball since, as shown in FIG. 3, the mouth of the bearing 15 is outwardly flared or tapered as at 21a, and the shaft 1 projecting from the ball can tilt through a wide angle in the mouth 21a of the bearing without contacting the bearing. Tilting action of 45° (included angle) or more in any direction is accommodated. The bearing 15 can slide in the housing 23 to accommodate some axial displacement of the shafts 1 and 25.

The parts of the joint 10 other than the sintered metal bushings 7 and the cup-shaped bearing 15 are preferably made of metal, such as steel or the like.

When the ball joint coupling 10 is assembled, the bushings 7 and pins 5 will project through the slots 27 of the housing 23, but will terminate short of the perimeter of the flared end of the housing receiving the cap 31, as is clearly shown in FIGS. 3 and 4.

Rotation of the shafts 1 and 25 is transmitted throughout a wide angle, with the driving connection established through the dowl pins 5, sintered bushings 7 and side walls of the slot 27 in the housing 23.

As shown in FIG. 3, the end cap 31 overlies the open end of the plastic bearing 15 to limit sliding of the bearing between a shoulder 23a at the inner end of the housing 23 and the cap.

In the modification 10a of FIGS. 5 and 6, parts substantially identical with parts described in the embodiment 10 of FIGS. 1–4 have been marked with the same reference numerals. In the coupling 10a, however, the housing 23 has its slots 27 closed at both ends. These ends are rounded, as illustrated at 40. The inner ends of the slots 19 of the bearing 15 are, likewise, rounded at 42 in substantial alignment with the inner rounded ends 40 of the slots 27. In addition, the pins 5 ride directly in these slots 19 and 27, since the bushings 7 are not used.

Instead of crimping a cover plate, such as 31, over the open end of the housing 23, in the modification 10a a ring 44 is pressed in the open end of the housing, with an end 46 of the housing beyond the ring being crimped over the ring to ensure retention of the ring in the housing. The ring overlies the open mouth of the bearing 15.

A flexible boot 48 covers the coupling 10a and has an opening 50 at one end receiving the shaft 25 therethrough, together with an opposite opening 52 fitting snugly around the shaft 1. The boot is flexible, being composed of rubber or the like, to accommodate articulating movements of the shafts 1 and 25.

As shown in FIG. 6, the bearing 16 is backed by a plane 54 bottomed on the shoulder 23a of the housing 23 to prevent extrusion or flow of the plastic bearing into the hollow shaft portion 25. This hollow shaft portion is adapted to receive a solid shaft coupled therewith by means of a clamp 56. As also in FIGS. 5 and 6, the shaft 1 is splined for connection to a hollow member (not shown).

To assemble the coupling 10a, the ball 3 is snapped into the bearing through the open end thereof, the bearing with the plate 54 on the leading end thereof and with the ball 3 therein introduced into the open end of the housing, and the pin 5 is pressed through the ball to extend through the slot 19 of the bearing 15 and 27 of the housing.

The bearing 15 is then retained in the housing by the lock ring 44, which is spun or otherwise anchored in the open mouth of the housing.

It will be understood that the above descriptions that rotational forces are transmitted between the coupling parts through the dowel pin, and that free tilting of the parts is accommodated through tilting of the ball member in its plastic socket. In addition, axial displacement of the shafts is accommodated by allowing some end clearance for the bearing 15 in the housing or some end yielding of the bushing under axial thrust of the ball 3.

What we claim is:

1. A universal joint coupling comprising a shaft with an open-end housing attached to one end thereof, said housing having oppositely disposed elongated slots therethrough, a second shaft with a ball attached to one end thereof, a bearing slidably mounted in said housing, said bearing having slots therethrough in alignment with said housing slots, pin means extending from opposite sides of said ball, said ball being mounted in said bearing with said nip means protruding through said slots and said second shaft extending through the open end of said housing, and means for retaining said ball in said housing.

2. A universal joint coupling in accordance with claim 1 in which said pin means are mounted in bushings adapted to slide in said slots.

3. A universal joint coupling in accordance with claim 2 in which said bushings are made of sintered metal.

4. A universal joint coupling in accordance with claim 3 in which said bushings are formed with projections on that portion of their outer surface located within said housing whereby to maintain said shafts in alignment.

5. A universal joint coupling in accordance with claim 1 in which said housing is longer than said bearing whereby to provide room for movement of the bearing in an axial direction.

6. A universal joint coupling in accordance with claim 1 which is enveloped in a rigid cover.

7. A universal joint coupling in accordance with claim 6 in which said cover is formed with an opening about said first shaft which enables the cover to move relative to said shaft.

8. A universal joint coupling in accordance with claim 7 in which said cover fits snugly about said second shaft and is adapted to move therewith.

9. A universal joint coupling in accordance with claim 1 in which said means for retaining said ball in said housing is a plate, having a central opening larger than said second shaft and fastened to the open end of said housing.

10. A universal joint coupling adapted for steering columns and the like which comprises, a cup-shaped housing for attachment to a first shaft, a ball member for attachment to a second shaft, a cup-shaped plastic bearing seated in the cup-shaped housing, said bearing and housing having diametrically disposed aligned longitudinally extending slots, the said slots in the said housing having closed axial ends whereby the said slots are surrounded by the material of the said housing, said plastic bearing providing a ball seat for the ball member, pin means projecting from diametrically opposite sides of the ball member riding in said slots, a ring member freely surrounding the second shaft secured to said housing for holding the components in assembled relation, and a seal member surrounding said coupling with a shaft-like projection of the said housing projecting through the said seal member and a shaft attached to the said ball projecting through the said seal member at the end of the said housing remote from the shaft projection of the said housing.

References Cited

UNITED STATES PATENTS

| | | | |
|---|---|---|---|
| 972,270 | 10/1910 | Smith | 64—8 |
| 990,627 | 4/1911 | Bogart | 64—8 |
| 3,098,365 | 3/1963 | Pearson | 64—7 |

MARK M. NEWMAN, Primary Examiner

R. HEALD, Assistant Examiner